Nov. 30, 1965   D. M. POTTER   3,220,757
QUICK-DISCONNECT COUPLING
Filed March 22, 1962

INVENTOR
DAVID M. POTTER
BY
Berry & Brews
ATTORNEYS.

United States Patent Office 3,220,757
Patented Nov. 30, 1965

3,220,757
QUICK-DISCONNECT COUPLING
David M. Potter, Liberty Corners Road, Far Hills, N.J.
Filed Mar. 22, 1962, Ser. No. 181,627
5 Claims. (Cl. 287—104)

My present invention relates to couplings or connectors of the self-locking quick-disconnect type, and may be regarded as an improvement upon the device of my prior Patent 2,328,294. My prior device is characterized by having overlapping, interfitting as by interlocking teeth, terminal portions which are held together by an helical spring attached to a collar which is slidable along the joint formed by such portions. When the collar is brought into a position which compresses the spring to its fullest extent, the ends of the joined parts are then separable; when the collar is brought to the other end of its travel in which the spring is extended, the parts are held together due mainly to the force of the spring acting parallel to the long axis of the joint, and also to the fact that the coils of the spring bear against the same, since the spring tends to become reduced in diameter as it is extended.

While my prior device operated satisfactorily to resist tension and compression, it was not primarily adapted to resist forces of either bending or torsion.

It is therefore a principal object of my invention to devise a coupling connector of the general type of my previously patented device, which, while having all the advantages thereof, affords a positive connection capable of transmitting loads in bending and torsion as well as in tension and compression.

Other objects will be apparent as the description proceeds, and the features of novelty will be pointed out in the appended claims.

In carrying out my invention, I provide a sleeve or collar which at all times encircles one of the parts to be joined. The sleeve, when the parts are joined, encompasses the interlocking ends of the parts, and is of sufficiently close fit to be effective to maintain the interlock and cause the parts to resist forces of bending or torsion. In its retracted position, said sleeve is free of the overlapping parts, permitting them to separate. It is also a feature of my invention to provide means for locking the sleeve in both its extended and retracted positions. It is a further feature of my invention also to provide a spring of helical type, encircling a shank associated with said sleeve and contained between the said shank and the sleeve, which will serve to maintain the sleeve in locked position at either end of its travel. A still further feature is to provide means for maintaining the spring out of binding contact with the encircled part, whereby it can move freely therealong.

My invention will be best understood by reference to the following detailed description, taken with the annexed drawing, in which FIGURE 1 is a view, partly in longitudinal section, of a preferred embodiment;

Figure 1:
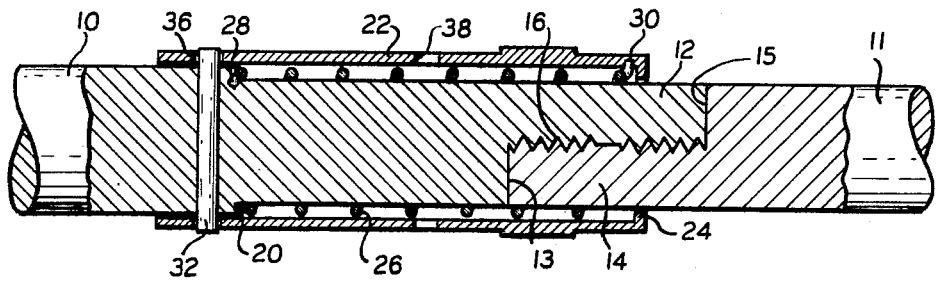

Referring now to the figures, 10 and 11 designate the respective terminals of the connector, which, it will be noted, are for a portion thereof, full round or circular section, and of similar size and shape. Terminal portion or shank 10 has a portion or member 12 which is half round, giving rise to a shoulder 13, whereas shank 11 similarly has a half round member 14 giving rise to shoulder 15. Preferably mating members 12 and 14 are of substantially identical length and each is formed with registering serrations or teeth 16 formed in the flat surface thereof, whereby such teeth in the respective parts are adapted to interlock in such a manner that the shoulders 13 and 15 respectively abut the ends of the parts. Thus assembled, and when held together as shown in FIG. 1, the overlapping shanks provide a round section, which, however, is of slightly reduced diameter as compared with the left terminal portion 10′, the purpose of which will be hereinafter apparent, such reduced diameter forming a shoulder 20 on shank 10.

For maintaining the parts in the locked position, and for releasing same, the following arrangement of parts is provided: Sleeve 22 is provided which extends from a short distance behind shoulder 20 to a point near the far end of half-round portion 12. Sleeve 22 has an inner flange 24 which affords an opening which will accommodate the joint formed by the half-round members 12, 14 with just enough clearance to facilitate free movement of the sleeve therealong. The sleeve 22 is held in place by means of helical spring 26, one end of which is secured to the part 10 as by being anchored in the shoulder 20 at 28, whereas its other end is attached to the end of the sleeve 22 adjacent said other end as at an accommodating recess 30. Sleeve 22 through spring 26 hugs the member 10 and a major portion of the joint 12–14. It also terminates in an inwardly directed flange 31, affording a slight clearance only with the terminal member 10, as clearly shown in FIGURE 1. In this manner, the sleeve not only affords a housing for the spring 26, but secures the joint against forces acting to disturb the same by twisting, bending, pulling apart, or buckling. It will be apparent that the sleeve 22 in the extended position of FIG. 1 maintains the members 12 and 14 in locked position due to the flange 24. On the other hand, when the sleeve is retracted against the force of the spring 26, the flange 24 is moved beyond the end of extension 14, allowing the parts to separate.

Figure 2:
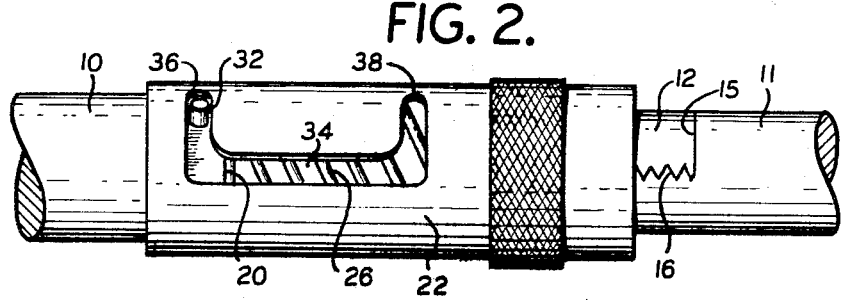
FIGURE 2 is a similar view not in section.

In order to control the movement of the sleeve and to provide for locking it in either its extended or retracted position, I now provide a pin 32 passing through the part 10, and behind the shoulder 20 and extending beyond said part sufficiently to engage openings or slots in the sleeve 22. As will be evident from FIGS. 2 and 3, said openings are preferably U-shape, with the base 34 of the U extending parallel with the long axis of the sleeve and with the arms 36, 38 of the U extending circumferentially of the sleeve and constituting arcuate slots. Preferably, and as indicated in FIG. 1, slot 34–38 is duplicated 180° around the sleeve 22 so as to engage both ends of pin 32. Desirably, the slots 36, 38 and the spring 26 are arranged so that the turning action or torque exerted by the spring is of a direction so as to urge the sleeve 22 rotatively toward the pin 32, so that when the sleeve is moved to a point where the pin is opposite the arcuate slots 36 or 38, the sleeve will snap into the locking positions of either FIG. 2 or FIG. 3. Also, when it is desired to move the sleeve longitudinally to either locked position, it will be necessary to rotate the sleeve against the tension of the spring for an angular distance represented by an arcuate slot 36 or 38, and in so doing, unwind the spring sufficiently to free it from it embrace of the part 10.

Figure 3:
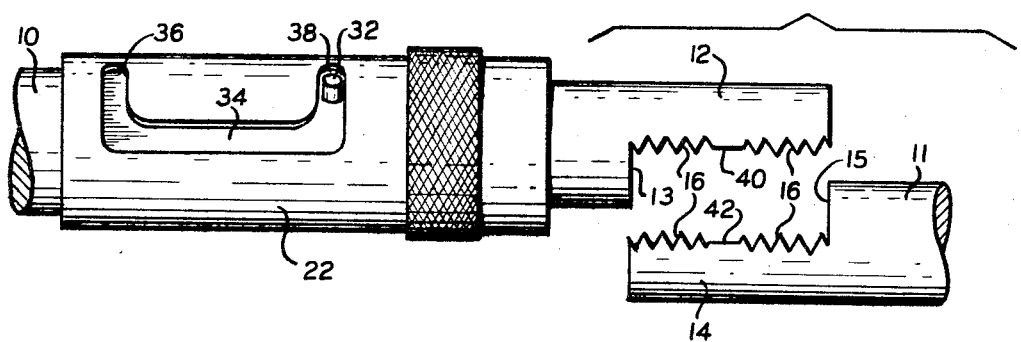
FIGURE 3 is a view similar to FIGURE 2, but showing the locking sleeve in retracted position, and the parts separated.

The manner of using the device will be obvious from the description thus far: when the sleeve is retracted to the position of disengagement of FIG. 3, it snaps into the position shown there by the torque action of spring 26 in which position pin 32 engages the back of the slot 38. To effect engagement of the parts 10 and 14, they are brought together as shown in FIG. 1, whereupon the sleeve 22 is rotated against the action of spring 26 to bring pin 32 out of arcuate slot 38 allowing the sleeve to be propelled by spring 26 into the position of FIG. 2. The spring torque, by snap action, brings the back of the slot 38 against the pin 32 thereby locking the parts in place. It will be noted that the torque exerted by the spring 26 acts constantly to maintain the pin 32 against the back of the arcuate slot 36 as shown in FIG. 1, thereby insuring against accidental disturbance and unlocking of the parts.

The pin 32 may be frictionally held in part 10 as shown, or in lieu of a single pin, the pin may be replaced by two parts, each of which is screwed into the member 10. As shown in FIGS. 1 and 3, the half-round members 12 and 14 may be provided with registering flat portions 40, 42 to prevent mating thereof except when brought together with a full overlap.

It will be understood that changes may be made from the embodiment specifically described without departing from the spirit of my invention, or from the scope of the appended claims.

I claim:

1. A connector for two parts each having a shank of substantially the same diameter terminating in mating portions having mutual overlapping and interlocking means extending for a substantial portion of the length thereof, such that when said parts are so held together, said interlocking means tends to resist forces tending to pull said parts asunder, such parts, when united, thereby forming a joint serving as the apparent continuation of each of said shanks, a sleeve around one of said shanks and slidable from a retracted position in which said parts may be released from one another, to an extended position in which said sleeve surrounds said joint for a substantial proportion of its length, and secures said joint against forces acting to disturb the same by twisting, bending, pulling apart, or buckling, a helical spring contained within said sleeve and encircling the associated shank, said spring being connected one end to said shank, and the other to said sleeve, whereby in its retracted position said sleeve compresses said spring, said sleeve having a longitudinally extending slot, a pin in said shank associated with said sleeve and engaging in said slot whereby said longitudinal slot keeps said spring from coiling against and binding upon its associated shank.

2. A connector according to claim 1 in which said sleeve has a circumferential slot communicating with said longitudinal slot, said circumferential slot being engageable by said pin when said sleeve is in its retracted position, thereby locking the sleeve in such position.

3. The connector according to claim 1 in which said longitudinally extending slot in said sleeve has a connecting circumferential slot engaged by said pin when said sleeve is in its extended position, thereby locking said sleeve in such position.

4. The connector according to claim 3 in which said sleeve has a circumferential slot communicating with said longitudinal slot, said circumferential slot being engageable by said pin when said sleeve is in its retracted position, thereby locking the sleeve in such position.

5. The connector according to claim 4 in which the spring is so disposed that its turning action will tend to cause said pin to enter either of said circumferential slots.

References Cited by the Examiner

UNITED STATES PATENTS

| 649,444 | 5/1900 | Good | 287—103 |
|---|---|---|---|
| 1,505,318 | 8/1924 | Berlow. | |
| 1,904,061 | 4/1933 | Larson | 287—119 |
| 2,328,294 | 8/1943 | Potter | 287—104 |

FOREIGN PATENTS

| 277,923 | 9/1914 | Germany. |

CARL W. TOMLIN, *Primary Examiner.*

WALTER A. SCHEEL, *Examiner.*